United States Patent
Mendes Oliveira et al.

(10) Patent No.: US 10,519,272 B2
(45) Date of Patent: Dec. 31, 2019

(54) ABSORBENT POLYMERIC MATERIAL, METHOD FOR PRODUCING SAME AND USES THEREOF

(71) Applicant: POSSIBLE ANSWER, S.A., Barco GMR (PT)

(72) Inventors: Nelson Duarte Mendes Oliveira, Joane (PT); Bruno Alexandre Couto Oliveira, Tebosa (PT); Igor Alexandre Vieira Ribeiro, Freixo PTL (PT)

(73) Assignee: POSSIBLE ANSWERS, S.A., Barco GMR (PT)

( * ) Notice: Subject to any disclaimer, the term of this patent is extended or adjusted under 35 U.S.C. 154(b) by 11 days.

(21) Appl. No.: 15/711,980

(22) Filed: Sep. 21, 2017

(65) Prior Publication Data

US 2018/0112028 A1 Apr. 26, 2018

Related U.S. Application Data

(63) Continuation of application No. PCT/IB2016/056289, filed on Oct. 19, 2016.

(30) Foreign Application Priority Data

Oct. 19, 2015 (PT) .......................... 108898

(51) Int. Cl.
| | |
|---|---|
| C08G 18/10 | (2006.01) |
| C08G 18/75 | (2006.01) |
| C08G 18/32 | (2006.01) |
| C08G 18/34 | (2006.01) |
| C08G 18/76 | (2006.01) |
| C08G 18/48 | (2006.01) |
| C08G 18/66 | (2006.01) |
| C08G 18/36 | (2006.01) |
| C08G 18/72 | (2006.01) |

(52) U.S. Cl.
CPC ........... *C08G 18/758* (2013.01); *C08G 18/10* (2013.01); *C08G 18/324* (2013.01); *C08G 18/3206* (2013.01); *C08G 18/3228* (2013.01); *C08G 18/341* (2013.01); *C08G 18/36* (2013.01); *C08G 18/4825* (2013.01); *C08G 18/4833* (2013.01); *C08G 18/6692* (2013.01); *C08G 18/724* (2013.01); *C08G 18/7664* (2013.01); *C08G 18/7671* (2013.01)

(58) Field of Classification Search
CPC .... C08G 18/758; C08G 18/10; C08G 18/341; C08G 18/36; C08G 18/3206; C08G 18/324; C08G 18/4825; C08G 18/724; C08G 18/7664; C08G 18/7671
USPC ....................................................... 523/222
See application file for complete search history.

(56) References Cited

U.S. PATENT DOCUMENTS

| | | |
|---|---|---|
| 2005/0037189 A1 | 2/2005 | Palmer et al. |
| 2007/0256597 A1 | 11/2007 | Rukavina et al. |
| 2009/0227406 A1* | 9/2009 | Wu ........................ C08G 18/12 474/238 |

FOREIGN PATENT DOCUMENTS

| | | |
|---|---|---|
| EP | 0121396 A2 | 10/1984 |
| EP | 1897609 A2 | 3/2008 |
| EP | 2716675 A1 | 4/2014 |
| JP | 2001260142 A | 9/2001 |
| WO | 9303090 A1 | 2/1993 |
| WO | 2004103231 A1 | 12/2004 |
| WO | 2008115636 A2 | 9/2008 |
| WO | 2015007731 A1 | 1/2015 |
| WO | 2015035068 A1 | 3/2015 |

OTHER PUBLICATIONS

"Percent by Mass," Available at www.ausetute.com.au (Year: 2018).*
International Search Report and Written Opinion for International Patent Application No. PCT/IB2016/056289 dated Mar. 2, 2017. 10 pages.

* cited by examiner

*Primary Examiner* — Hannah J Pak
(74) *Attorney, Agent, or Firm* — Leason Ellis LLP

(57) ABSTRACT

The present disclosure relates to a polymeric material having dilating properties and production of the respective material, such that it is incorporated into protective products/equipments to absorb impact energy resulting from a collision. This material may be used in motorcyclists' or sports helmets, ballistic vests, kneepads, elbow pads, protective footwear and any other personal protective products.

17 Claims, 1 Drawing Sheet

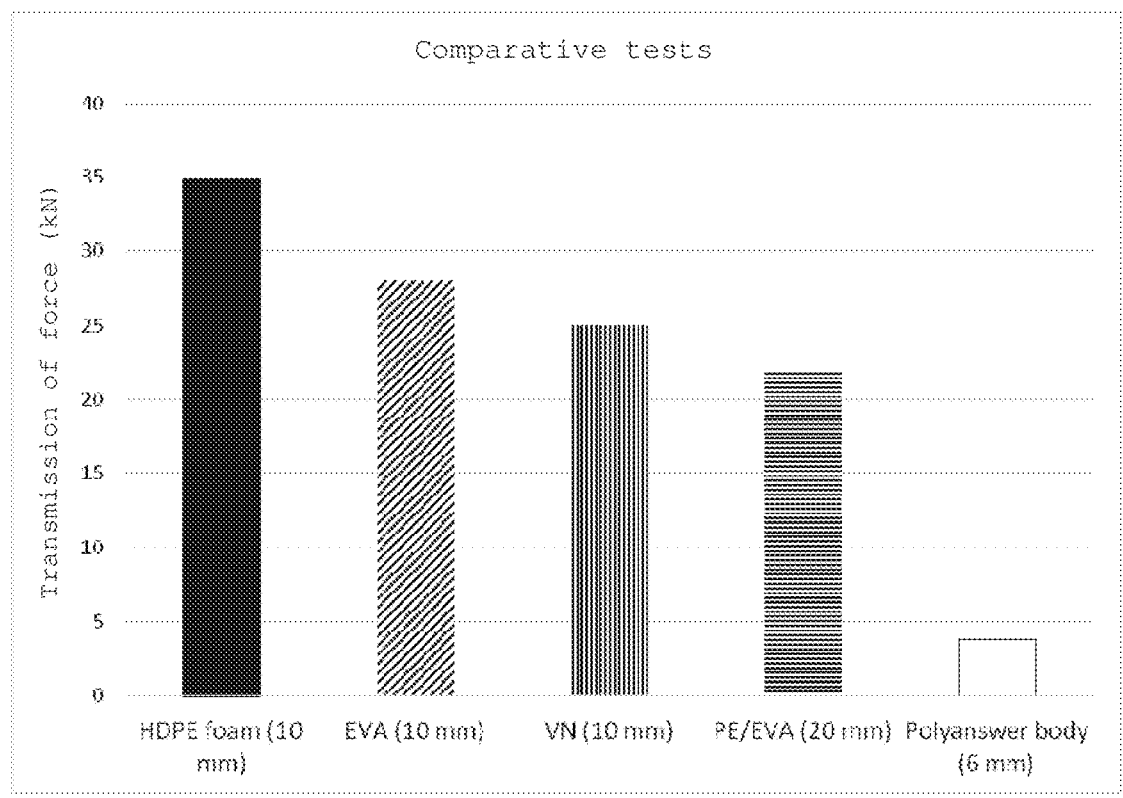

ABSORBENT POLYMERIC MATERIAL, METHOD FOR PRODUCING SAME AND USES THEREOF

CROSS-REFERENCE TO RELATED APPLICATIONS

This application is a U.S. Continuation Application under 35 U.S.C. § 119 of International Patent Application No. PCT/IB2016/056289, filed Oct. 19, 2016, which claims priority to Portugal Application No. 108898, filed Oct. 19, 2015, which are hereby incorporated by reference in their respective entireties.

TECHNICAL FIELD

The current disclosure relates to a polymeric material with dilating properties and production thereof, so it can be incorporated into protection products/equipments to absorb impact energy resulting from a collision.

BACKGROUND ART

Protective products and equipment are extremely important and vital for the safety and protection of people to prevent harm or serious injuries resulting from an impact or collision.

In recent decades, the development of protective materials has experienced a major technological advance wherein diverse types of materials are currently used, such as: foams, fibres, and polymeric composites. Despite the great effort in development, the materials used do not efficiently prevent the collateral harm/injuries resulting from impacts. This situation occurs because the materials used do not possess sufficient capacity to absorb the impact energy arising from a collision, this energy being absorbed by the body of the users, causing serious injuries or even death. Furthermore, these types of materials used are generically heavy, rigid, somewhat inflexible and somewhat non-ergonomic.

The use of this kind of materials has different approaches to the absorption of impact energy in the protective products. In the case of fibres and polymeric composites, these have the objective of non-penetration/perforation, not preventing deflection and, in some cases, total rupture of the fibres and polymeric composites occurs. In the case of foams, the objective thereof is absorption of the energy of impact caused by the crash, but they do not prevent perforation; the use of materials having dilating properties (non-Newtonian fluid) is with a view to the reaction of the materials when the latter are subjected to impacts, significantly improving the capacity of absorption of impact energy of the protective products.

Recently, there has been strong interest in research and development in the use of dilating fluids as a material to be incorporated into a personal protective product. Non-Newtonian fluids are often denominated dilating materials. Dilating fluids are materials the properties whereof depend solely on the intensity of the stress applied, that is to say, these materials demonstrate an increase in viscosity with the increase in the stress applied. Dilatancy is a rheological property common to several polymeric systems, although it does not occur in pure polymers and, unlike pseudoplasticity, it depends on the polymeric system considered: solution, suspension, dispersion or emulsion, and is not restricted to a specific particle size.

The development of dilating fluids and the combination thereof with various types of materials has also been studied. The combination between Kevlar fibres and colloidal mixtures using polyethylene glycol (PEG) and nanoparticles of silica, talc and poly(methyl methacrylate) (PMMA) permits increasing the protection against impact. Colloidal solutions, such as clay, quartz, iron oxide, calcareous schist, titanium dioxide, alumina, hematite and barium sulphate have already been studied. It is also possible to obtain non-Newtonian fluids with blood cells, starch and wheat and corn starch. Polymers are also used to produce colloidal solutions; in this case nanoparticles of polyvinylchloride (PVC), poly(styrene-co-acrylonitrile) (PS-AN), polystyrene (PS), poly(methyl methacrylate) (PMMA), poly(styrene-ethyl-acrylate) (PS-EA) and nanofibres of carbon, poly(t-butylstyrene) in mineral oil (3 g/dl), suspension data of styrene-methyl acrylate copolymer (15% by volume) in aqueous solutions of poly(acrylic acid) (1% by weight). Other colloidal solutions studied in the literature were the mixture of nanospheres of poly(styrene-acrylic acid) and ethylene glycol. In the same study, the mixture of nanospheres of poly(styrene-acrylic acid-divinylbenzene) and the same liquid was evaluated. Other dilating materials are polymeric silicones, such as the siloxanes, borate, or polyborodimethylsiloxane (PBDMS) in polyurethane or synthetic elastomers.

The document EP1897609 A2 relates to a composite comprising a non-Newtonian fluid, wherein it is combined with an immiscible or partially-miscible material and wherein the non-Newtonian fluid comprises a suspending fluid and suspended particles having a dimension of less than 10 μm.

The document WO2004103231 A1 describes a product capable of dissipating kinetic energy of a moving object, such as a projectile, and comprises a material having fibres, wherein these are impregnated with particles (polymers, oxides, minerals) suspended in a solvent. These fibres may be of aramid, carbon, nylon, high molecular weight polyethylene, or glass.

The document WO2008115636 A2 describes the production of hollow plastic fibres wherein is incorporated a dilating fluid, the fluids used being based on colloidal systems, more specifically a mixture between polyethylene glycol (PEG) and silica powder.

The document US20050037189 A1 consists of describing a dilating fluid capable of being encapsulated in an elastomeric matrix, more specifically in a foam having closed cells, wherein the dilating fluid is a mixture of a polyurethane foam with polyborodimethilsiloxane (PBDMS) incorporated into an elastomeric polyurethane foam. The company BAE Systems is attempting to develop a solution combining Kevlar fibres with dilating fluids (this fluid being composed of ethylene glycol and silica).

However, in the cases cited there are situations wherein the dilating fluid must be contained or enveloped in a kind of fabric or material and, due to the nature thereof, is not self-sustainable, the resulting products having little flexibility and, in other cases cited, the manufacturing processes are relatively complex and expensive.

These documents illustrate the technical problem to be solved by the present disclosure.

General Description

The present disclosure relates to energy-absorbent polymeric materials used in systems designed for personal protection, specifically protective equipment, and respective process for the obtainment thereof having recourse to materials having dilating properties. The present disclosure also relates to the process for obtention of the energy-absorbent polymeric material.

The present disclosure relates to the development of a non-Newtonian fluid and the process of the obtention thereof having recourse to materials having a renewable source and applicability thereof.

The present disclosure relates to a composite comprising the development of a non-Newtonian fluid, wherein this may be combined with diverse materials and by diverse techniques.

A non-Newtonian fluid is a material the tangential stress whereof is directly proportional to the rate of deformation and, consequently, may not exhibit a well-defined viscosity. This material exhibits a unique feature: the viscosity thereof increases with the increase in the stress applied. These materials tend to exhibit a similar behaviour to that of solid materials, over a small fraction of time, when a high shear stress is applied.

Another of the major advantages of this kind of material is the reversibility of the deformations. The properties of this material are dependent on the volume, distribution and size and shape of the particles, the viscosity of the carrier and the mixture. Under the action of a shear force, it goes from a bidimensional structure (wherein the particles are arranged in layers) to a random 3D structure. The dilating fluid absorbs the energy of the impact, subsequently distributed over the largest area possible, having the objective of reducing the area of fracture of the material.

The present solution also relates to a process of production for obtaining non-Newtonian fluid, having recourse to materials having a renewable source. The obtention of this fluid results from a chemical reaction between various components in order to obtain a single material. The addition reaction is a polymerisation reaction permitting increasing the molecular weight of a particular polymeric chain, without the release occurring of any chemical species. The material presented is malleable and flexible without the application of a stress, when a stress is applied there is a reaction of the material to the stress applied, rendering it rigid.

The present disclosure relates to a polymeric material to absorb and dissipate kinetic energy comprising:
  20-70% (w/w) of an isocyanate having a molecular weight between 100-1000 g/mol; preferably 100-500 g/mol; preferably 200-400 g/mol;
  20-70% (w/w) of a polyol having a molecular weight between 30-6000 g/mol; preferably 60-300 g/mol;
  wherein the isocyanate and polyol combination comprises 2 to 5 reactive groups;
  wherein the polyol comprises at least 2 reactive groups, preferably 3 reactive groups;
  1-10% (w/w) of a plasticiser having a molecular weight between 50-6000 g/mol, preferably 80-3000 g/mol.

The polymeric material of the present disclosure dissipates energy/impact more efficiently than the other alternatives, the performance thereof being approximately 8-10 times superior to the alternatives available.

In an embodiment for better results, the polymeric material may comprise 30-65% (w/w) of isocyanate, preferably between 40-60% (w/w) of isocyanate.

In an embodiment for better results, the reactive groups of the polymeric material may be selected from the following list: isocyanate, hydroxyl, and combinations thereof.

In an embodiment for better results, the isocyanate may be selected from the following list: 4,4'-diphenylmethane diisocyanate/1,1'-methylene bis(4-isocyanatobenzene), 2,4'-diphenylmethane diisocyanate/1-isocyanate-2-(4-phenylisocyanate)methylbenzene, 2,2'-diphenylmethane diisocyanate/1,1'-methylene bis(2-isocyanatobenzene), 4,4'-dicyclohexylmethane diisocyanate/1,1'-methylene-bis(4-isocyanatocyclohexane), naphthalene 1,5-diisocyanate/1,5-diisocyanatonaphthalene, triphenylmethano-4,4',4"-triisocyanate/1,1',1"-methylene tris(4-isocyanatobenzene), meta-tetramethylxylene diisocyanate/bis(isocyanato-1-methyl-1-ethyl)-1,3-benzene, isophorone diisocyanate (IPDI)/5-isocyanato-1-(methylisocyanate)-1,3,3'-trimethylcyclohexane, hexamethylene diisocyanate/1,6-diisocyanatohexane and poly(diphenylmethane diisocyanate) (PMDI) and mixtures thereof.

In an embodiment for better results, the isocyanate may be selected from the following list: 4,4'-diphenylmethane diisocyanate/1,1'-methylene bis(4-isocyanatobenzene), 4,4'-dicyclohexylmethane diisocyanate/1,1'-methylene-bis(4-isocyanatocyclohexane), poly(diphenylmethane diisocyanate) and mixtures thereof.

In an embodiment for better results, the polymeric material may comprise 30-65% (w/w) of polyol, preferably 35-55% (w/w).

In an embodiment for better results, the polyol may be selected from the following list: 1,2-propanediol, 1,2,6-hexanetriol, glycerol, 1,2-ethanediol, 2-methyl-2,4-pentanediol, erythritol, sorbitol, diethylene glycol, trimethylolpropane, pentaerythritol, polyether triol, polyester triol, co-polyether triol, α-methylglucoside, fructose, glucose, ribitol, xylitol, 1,4-butanediol, 1,3-propanediol, Mannich polyols, novolac-based polyether polyols, melamine-based polyols, and mixtures thereof.

In an embodiment for better results, and in order to achieve even more superior results, the polyol may be selected from the following list: 1,2-propanediol, glycerol, 1,2-ethanediol, and mixtures thereof.

In an embodiment for better results, and in order to achieve even more superior results, the polyol comprises at least 2 reactive groups.

In an embodiment for better results, the polymeric material may furthermore comprise a plasticiser in a concentration of 1-10% (w/w), preferably between 1-7% (w/w).

In an embodiment for better results, said plasticiser may be selected from the following list: castor oil, polypropylene glycol, polyethylene glycol, 2-methyl-1,3-propanediol, and mixtures thereof.

In an embodiment for better results, the polymeric material may also comprise an amine, a carboxylic acid, and mixtures thereof.

In an embodiment for better results, the polymeric material may comprise 1-3% (w/w) of an amine or 1-3% (w/w) of a carboxylic acid.

In an embodiment for better results, the amine may be selected from the following list: triethanolamine, ethylenediamine, diethylenetriamine, ortho-toluenediamine, dimethylaminoethanol, dimethylaniline, dimethylbenzylamine, diethylmethylbenzenediamine, imidazole, dimethylalkylamine, tetramethylethylenediamine, pentamethyldiethylenetriamine, and substitutes and mixtures thereof.

In an embodiment for better results, and in order to achieve even more superior results, the amine may be diethylmethylbenzenediamine, ethylenediamine, and mixtures thereof.

In an embodiment for better results, the carboxylic acid may be selected from the following list: acetic acid, ethanedioic acid, propanedioic acid, pentanedioic acid, citric acid, adipic acid, butanedioic acid, isophthalic acid, terephthalic acid, and mixtures thereof.

In an embodiment for better results, and in order to achieve even more superior results, the carboxylic acid may be ethanedioic acid, propanedioic acid and mixtures thereof.

In an embodiment for better results, the polymeric material may comprise a plurality of layers.

In an embodiment for better results, the polymeric material may be encapsulated, preferably by a layer of liquid silicone.

In an embodiment for better results, the polymeric material may comprise a layer of a 3D fabric, in particular as coating layer.

In an embodiment for better results, the polymeric material may be mixed with thermoplastic and/or thermosetting polyurethane systems.

In an embodiment for better results, the polymeric material may be mixed with thermoplastic polymers (ethylvinylacetate, polypropylene, polyethylene, polyvinyl chloride), thermosetting polymers and elastomers (TPU) through the conventional polymer processing techniques, in particular extrusion and injection.

The present disclosure also relates to an article that may comprise the aforedescribed polymeric material, and the said article may be a motorcycling or sports helmet, ballistic vest, knee pad, elbow pad, back protectors, gloves, footwear protectors, and protective equipments.

The present disclosure also relates to a compound having the formula I:

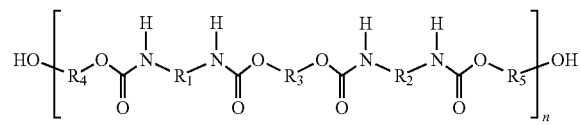

wherein $R_1$ and $R_2$ are selected from a list consisting of an alkyl, or $C_6$-$C_{47}$ aryl, preferably $C_6$-$C_{30}$;

$R_3$ is a secondary or tertiary $C_3$-$C_{20}$ alcohol;

$R_4$ and $R_5$ are selected from a list consisting of an alkyl, or $C_6$-$C_{47}$ aryl, or a $C_3$-$C_{20}$ alcohol, wherein $R_1$, $R_2$, $R_3$, $R_4$ and $R_5$ are selected independently, and n ranges from 1-30, preferably 7-30, more preferably 15-30.

In the present disclosure the term "alkyl" refers to a linear, cyclic or branched hydrocarbon group comprising from 1 to 10 carbon atoms, preferably from 1 to 6 carbon atoms, in particular from 1 to 3 carbon atoms. From among the alkyl groups there may be mentioned, in terms of an example, the groups methyl, n-propyl, isopropyl, n-butyl, sec-butyl, terc-butyl, n-pentyl, n-hexyl, and cyclohexyl.

The term "alkenyl" refers to an alkyl group as defined above, comprising furthermore at least one C=C double bond.

The term "alkynyl" refers to an alkyl group as defined above, comprising furthermore at least one CC triple bond.

The term "aryl" refers to a group comprising, at least, one planar ring. Preferably, the aryl group is a hydrocarbon aryl group. Preferably, the aryl group is selected from the group consisting of the phenyl, pyridinyl, pyrimidinyl, pyrazinyl, pyridazinyl, triazinyl, furanyl, thiophenyl, pyrrolyl, imidazolyl, triazolyl, oxazolyl, isoxazolyl, triazolyl, diazinyl, tetrazinyl, pyrazolyl, and naphthyl group.

The primary alcohols have the hydroxyl group bound to a primary carbon, such as methanol, ethanol, propanol.

The secondary alcohols have the hydroxyl group bound to a secondary carbon, that is, a carbon atom that is bound to only two other carbon atoms, such as 2-propanol (isopropanol).

The tertiary alcohols have the hydroxyl group bound to a tertiary carbon, such as for example 2-methyl-2-propanol (terc-butanol), 2-methyl-2-butanol (terc-pentanol, trimethylcarbonyl), or mixtures thereof.

In a manner of embodiment for superior results, $R_1$ and $R_2$ may be alkyls, or $C_6$-$C_{15}$ aryls, and $R_3$ may be a $C_3$-$C_{15}$ secondary alcohol;

In an embodiment for better results, $R_4$ may be a secondary or tertiary alcohol.

In an embodiment for better results, $R_5$ may be a $C_5$-$C_{15}$ secondary alcohol.

In an embodiment for better results, $R_1$ may be the same as $R_2$.

In an embodiment for better results, $R_3$ may be the same as $R_4$ and $R_5$.

In an embodiment for better results, $R_3$ may be the same as $R_4$ and $R_5$.

In an embodiment for better results in which $R_3$, $R_4$, $R_5$ may be the same.

In an embodiment for better results, $R_1$ may be hexane or diphenylmethane, $R_2$ may be hexane or diphenylmethane; $R_3$ may be $C_3H_6O$; $R_4$ may be $C_3H_6O$ or $[O-CH_2-CH_2]_n$, wherein n may be from 1-8 and $R_5$ is $C_3H_6O$.

In an embodiment for better results, $R_3$, $R_4$ and $R_5$ are 2-propanol; $R_1$ and $R_2$ are diphenylmethane.

In an embodiment for better results, the molecular weight of the compound of formula I may vary between 500-50 000 g/mol, preferably 5000-30 000 g/mol, more preferably between 11 000-21 000 g/mol, in particular 10 000.

In an embodiment for better results, the afore-described polymeric material may comprise the compound herein described and disclosed.

The present disclosure also relates to a process for producing a polymeric material or a compound, previously described, comprising the following steps:
 mixing an isocyanate with a polyol at a temperature between 25° C.-80° C.;
 adding to the previous mixture a plasticiser, an amine and/or carboxylic acid;
 mixing the previous mixture at a mixing speed between 50-2000 rpm for 1-240 minutes in a range of temperature between 25-80° C.;
 performing the previous steps under vacuum;
 putting the material produced to rest in an oven for a certain time, preferably comprising between 1-36 hours, at an oven temperature comprising a range from 30-100° C., in particular from 30-80° C.;
 preferably keeping the polymeric material in a closed system and preferably in an environment having low humidity.

In an embodiment for better results, the process may also comprise a step of encapsulation of the polymeric material or compound.

The polymeric material disclosed in the present disclosure exhibits a greater capacity of absorption and dissipation of impact energy such that it may be incorporated into personal protective products in order to promote the reduction in serious injuries caused by impacts and/or collisions. The use of this material clearly renders protective products lighter, more flexible and effective in absorbing the impact energy, rendering the protective products more comfortable, ergonomic, safe and easy to use.

Throughout the description and claims, the word "comprises" and variations thereof do not have the intention of excluding other technical characteristics, such as other components, or steps. Additional objects, advantages and characteristics of the disclosure will become evident to experts in the art subsequent to the examination of the description or may be comprehended through the practice of the disclosure. The following examples and figures are provided in an illustrative manner and do not have the intention to limit the present disclosure. Furthermore, the present disclosure covers all the possible combinations of particular or preferential manners of embodiment herein described.

BRIEF DESCRIPTION OF THE DRAWINGS

For easier understanding, the attached drawings are annexed representing preferential embodiments not intending to limit the object of the present description.

FIG. 1 shows the values of transmission of force (according to standard EN20344:2011) of commercial materials and of the polymeric material disclosed according to example III (Polyanswer).

DETAILED DESCRIPTION

The present disclosure has as object the development of new polymeric materials for the absorption of impact energy utilisable in systems and/or equipments designed to protect people. The solution now disclosed permits the existence of a greater absorption of impact energy by the material, permitting less energy be transmitted to the user, having the intention of obtaining, as a consequence, a reduction in the trauma and injuries which may be caused by impacts and crashes.

The present disclosure presents a new material, in particular a dilating fluid together with the method of production method and use thereof. The percentage of incorporation of fluid to be used in a formulation/composition will depend on the type of application, on the process and on economic factors.

In an embodiment, the compositions of the present disclosure are the result of a reaction of polyaddition, combining various materials in the same polymeric chain, such as: isocyanates, polyols, amines, carboxylic acids. In this manner, different compounds are added along the chain having the objective of producing a material having a specific property, in particular having the property of absorption and dissipation of energy resulting from high speed impact.

In an embodiment, in order for the product disclosed to exhibit the property of a material having dilating properties, it is necessary to have recourse to isocyanate compounds, of chemical formula R—N=C=O, conferring rigidity on the polymeric chain to be produced. Polyols must be added to the reaction. Based on the requirement for increasing or decreasing the rigidity, amines and carbonic acids having three or more functional groups must be added. The materials having three functional groups have the function of crosslinking, that is to say, linking different molecular chains. This bonding permits not solely increasing the distribution of impact energy but also increases the resistance of the final material to the loads applied. To increase the flexibility and strength of the chain, there must be added, furthermore, polyols, amines or carboxylic acids.

In an embodiment, in order to produce the polymeric material herein disclosed, the aforementioned reagents may be added simultaneously or sequentially during the reaction.

In an embodiment, the production of this polymeric material may be realised in a rotary mixer or in a single- or twin-spindle extruder, comprising the following steps:
  mixing beforehand the isocyanate with the polyol;
  adding to the formulation a plasticiser, and furthermore an amine and/or a carboxylic acid may be added;
  adding the compounds in a simultaneous or sequential manner;
  applying a mixing speed between 50-2000 revolutions per minute (rpm), preferably between 100-1000 rpm, most preferably between 100-400 rpm;
  the production process of the material comprises a duration of between 1-240 minutes, preferably between 30-200 minutes, most preferably between 90-180 minutes;
  the temperature of the production process comprises a temperature range between 10-120° C., preferably between 20-100° C., most preferably between 30-80° C.;
  during the process of production of the polymeric material the system is under vacuum;
  following the production of the polymeric material, it must be allowed to rest in an oven for a certain time, comprising between 1-36 hours, preferably between 3-30 hours, most preferably between 5-24 hours, at an oven temperature comprising a range from 30-100° C.;
  keeping the polymeric material in closed system and preferably in an environment having low humidity.

In an embodiment, the polymeric material obtained may comprise:
  an isocyanate having a molecular weight between 50-1000 g/mol, having 2-5 reactive groups and having a concentration between 20-70% (w/w), preferably between 30-60% (w/w), most preferably between 40-60% (m/m);
  polyol having a molecular weight between 30-6000 g/mol, having 2-5 reactive groups and having a concentration between 20-70% (w/w), preferably between 30-65%, most preferably between 35-55% (w/w);
  a plasticiser having a molecular weight between 50-6000 g/mol and having a concentration between 1-10% (w/w), preferably between 1-7% (w/w).

The present disclosure is illustrated by means of references to the following examples which will assist in the comprehension thereof and which shall not be interpreted as limitations to the same. All the percentages described are by weight (mass), unless specified otherwise. All temperatures are expressed in degrees Celsius.

Example I

This refers to the formulation of the polymeric material of the present disclosure having 57% of isocyanate and obtained commencing from the initial formulation shown in table 1.

TABLE 1

Formulation of the polymeric material having 57% of isocyanate of the final solution.

| Components | Percentage (%) w/w |
|---|---|
| 4,4'-Dicyclohexylmethane diisocyanate (HMDI)/1,1'-methylene-bis(4-isocyanatocyclohexane) | 57.0 |
| 1,2-Propanediol | 37.0 |

TABLE 1-continued

Formulation of the polymeric material having 57%
of isocyanate of the final solution.

| Components | Percentage (%) w/w |
|---|---|
| Polyethylene glycol | 3.0 |
| Diethylmethylbenzonamine | 1.5 |
| Propanedioic acid | 1.5 |

Mix beforehand the components (isocyanate, polyol, amine and acid) at a temperature of 25° C. Add the formulation to the rotary mixer at a mixing speed of 200 rpm for a period of 180 minutes at a temperature of 50° C. After 120 minutes of the production of the polymeric material the plasticiser, in this case being the polyethylene glycol, is added. The entire production process is under vacuum to ensure that the gases arising from the reaction and the humidity do not affect the quality of the material obtained.

Following the production of the polymeric material it is transferred to an oven at a temperature of 60° C. for 24 hours. Subsequently, the polymeric material is kept in a closed system having low humidity.

Example II

This refers to the formulation of the polymeric material of the present disclosure having 52.0% of isocyanate and obtained commencing from the initial formulation shown in table 2.

TABLE 2

Formulation of the polymeric material having 52.0%
of isocyanate of the final solution.

| Components | Percentage (%) w/w |
|---|---|
| 4,4'-Diphenylmethane diisocyanate (MDI)/1,1'-methylene bis(4-isocyanatobenzene) | 52.0 |
| 1,2-ethanediol | 42.0 |
| Polypropylene glycol | 4.0 |
| Ethanodioic acid | 2.0 |

The process of the production of the polymeric material is carried out in the same manner as that used in example I, in the same order and using the same equipments.

Example III

This refers to the formulation of the polymeric material of the present disclosure having 42.5% of isocyanate and obtained commencing from the initial formulation shown in table 3.

TABLE 3

Formulation of the polymeric material having 42.5%
of isocyanate of the final solution.

| Components | Percentage (%) w/w |
|---|---|
| 4,4'-Diphenylmethane diisocyanate (MDI)/1,1'-methylene bis (4-isocyanatobenzene) | 42.5 |

TABLE 3-continued

Formulation of the polymeric material having 42.5%
of isocyanate of the final solution.

| Components | Percentage (%) w/w |
|---|---|
| Glycerol | 52.5 |
| 2-methyl-1,3-propanodiol | 5.0 |

The process of the production of the polymeric material is carried out in the same manner as that used in example I, in the same order and using the same equipments.

TABLE 4

Formulation of the polymeric material having
47.5% of isocyanate of the final solution.

| Components | Percentage (%) w/w |
|---|---|
| Polydiphenylmethane diisocyanate (PMDI) | 47.5 |
| Glycerol | 47.5 |
| Castor oil | 3.0 |
| Ethylenediamine | 2.0 |

In an embodiment, mix beforehand the components (isocyanate and polyol) at a temperature of 25° C. Add the formulation to the rotary mixer at a mixing speed of 150 rpm, for a period of 180 minutes at a temperature of 50° C. After 120 minutes of production of the polymeric material, the amine (ethylenediamine) is added. After 150 minutes, the plasticiser (castor oil) is added. The entire production process is under vacuum to ensure that the gases arising from the reaction and the humidity do not affect the quality of the material obtained.

In an embodiment, after the production the polymeric material is transferred to an oven, at a temperature of 100° C. for 24 hours. Subsequently, the polymeric material is kept in a closed system having low humidity.

In an embodiment, the polymeric material of the present invention having non-Newtonian fluid properties may be encapsulated or coated with paints based on silicone or polyurethane, and may even be incorporated into polymeric matrices (thermoplastics, thermosets and elastomers) and/or thermoplastic and/or thermosetting polyurethane systems by means of conventional processing techniques.

In an embodiment, subsequent to being cured the polymeric material of the present invention may be coated by a layer of paint based on silicone or polyurethane having the function of confining and protecting the material. This addition may be carried out by means of an artist's-type or a decorator's-type paintbrush, or by means of a robot. Subsequent to the coating of the polymeric material, a new layer of a 3D fabric may be added, particularly as a coating layer.

In an embodiment, the incorporation of the material of the present invention into polymeric matrices (thermoplastics, thermosets and elastomers) or into thermoplastic and/or thermosetting polyurethane systems is possible by means of the admixture thereof with these materials. The formulations of the composites comprise a percentage of incorporation of dilating polymeric material of between 5-80% (w/w), more preferably of between 5-500 (w/w) of the total weight of the formulation.

In an embodiment, a mixture was made of the polymeric material of the present invention with a thermosetting polyurethane system wherein the formulation comprises 50% of polymeric material. The test was performed according to EN20344:2011, applying an impact force of 50 kN. The graph and table below show the values of transmission of force (kN) of some materials used in the market. It is concluded that the product of the present teaching (Polyanswer body (6 mm)) exhibits a greater capacity of absorption of energy, that is to say, it transmits less impact force, translated into a greater capacity of protection. This value was achieved using a thickness smaller than that used in the commercial materials.

In table I there may be observed the values of transmission of force (according to the standard EN20344:2011) of the commercial materials and of the polymeric material disclosed according to example III (Polyanswer).

TABLE 5

Values of transmission of force (according to the standard EN20344:2011) of the commercial materials and of the polymeric material disclosed according to example III (designated by the name Polyanswer)

| Commercial material | Chemical formula | Transmission of force (kN) |
| --- | --- | --- |
| HDPE foam (10 mm) | $-(CH_2-CH_2)-$ | 35 |
| EVA (10 mm) | $-(CH_2-CH_2)_n-(CH_2-CHOOCH_3)_m-$ | 28 |
| VN (10 mm) | $-(CH_2-CH_2-C\equiv N)_n-$ | 25 |
| PE/EVA (10 mm) | $-(CH_2-CH_2)_n-$ / $-(CH_2-CH_2)_n-(CH_2-CHOOCH_3)_m-$ | 22 |
| Polymeric material disclosed according to example III (6 mm)- Polyanswer body | $R_1 = R_2 =$ (diphenylmethane structure)     $R_3 = R_4 = R_5 = C_3H_6O$ | 3.8 |

The material of the present disclosure may be used in motorcyclists' and sports helmets, ballistic vests, knee pads, elbow pads, protective footwear and any other personal protective products.

In FIG. 1 it may be observed that the polymeric material of the present invention, in particular example 3, achieves improvement in the dissipation of energy when compared with other materials, specifically according to the standards EN20344:2011 or EN1621-1 (comparative with a test of 10 Joules), the dissipation of energy, in both standards, is approximately 8-10 times lower than the solutions available.

Although in the present solution solely particular embodiments of the solution have been represented and described, those skilled in the art will know how to introduce modifications and substitute technical characteristics by others being equivalent, depending on the requirements of each situation, without departing from the scope of the claims appended.

The embodiments presented may be combined with each other. The claims which follow additionally define preferential embodiments.

The invention claimed is:

1. A polymeric material for absorbing and dissipating kinetic energy, wherein the polymeric material comprises:

a. 30-65% (w/w) of an isocyanate having a molecular weight between 100-1000 g/mol;
   b. 20-70% (w/w) of a polyol having a molecular weight between 30-6000 g/mol, wherein the isocyanate and polyol combination comprises 2 to 5 reactive groups; wherein the polyol comprises at least one of or mixtures of 1,2-propanediol, glycerol, and 1,2-ethanediol; and
   c. 1-10% (w/w) of a plasticiser having a molecular weight between 50-6000 g/mol, wherein the plasticiser is selected from the group consisting of: castor oil, polypropylene glycol, polyethylene glycol, 2-methyl-1,3-propanediol, and mixtures thereof.

2. The polymeric material according to claim 1, comprising between 40-60% (w/w) of isocyanate.

3. The polymeric material according to claim 1, wherein the isocyanate is selected from the group consisting of 4,4'-diphenylmethane diisocyanate, 2,4'-diphenylmethane diisocyanate, 2,2'-diphenylmethane diisocyanate, 4,4'-dicyclohexylmethane diisocyanate, naphthalene 1,5-diisocyanate, triphenylmethano-4,4',4"-triisocyanate, meta-tetramethylxylene diisocyanate, isophorone diisocyanate, hexamethylene diisocyanate, and poly(diphenylmethane diisocyanate), and mixtures thereof.

4. The polymeric material according to claim 3, wherein the isocyanate is selected from the group consisting of 4,4'-diphenylmethane diisocyanate, 4,4'-dicyclohexylmethane diisocyanate, poly(diphenylmethane diisocyanate), and mixtures thereof.

5. The polymeric material according to claim 1, wherein the polymeric material comprises 30-65% (w/w) of polyol.

6. The polymeric material according to claim 1, wherein the polyol further comprises any one of or mixtures of 1,2,6-hexanetriol, 2-methyl-2,4-pentanediol, erythritol, sorbitol, diethylene glycol, trimethyolpropane, pentaerythriol, polyether triol, polyester triol, co-polyether triol, α-methyl glucoside, fructose, glucose, ribtol, xylitol, 1,4-butanediol, 1,3-propanediol, Mannich polyols, novolac-based polyether polyols, and melamine-based polyols.

7. The polymeric material according to claim 1, wherein the polymeric material comprises 1-7% (w/w) of the plasticiser.

8. The polymeric material according to claim 1, wherein the polymeric material further comprises 1-3% (w/w) of an amine, 1-3% (w/w) of a carboxylic acid, or mixtures thereof.

9. The polymeric material according claim 8, wherein the amine is selected from the group consisting of triethanolamine, ethylenediamine, diethylenetriamine, ortho-toluenediamine, dimethylaminoethanol, dimethylaniline, dimethylbenzylamine, diethylmethylbenzenediamine, imidazole, dimethylallylamine, tetramethylethylnodiamine, pentamethyldiethylenetriamine, and mixtures thereof.

10. The polymeric material according to claim 8, wherein the carboxylic acid is selected from the group consisting of: acetic acid, ethanedioic acid, propanedioic acid, pentanedioic acid, citric acid, adipic acid, butanedioic acid, isophthalic acid, terephthalic acid and mixtures thereof.

11. The polymeric material according to claim 1, wherein the polymeric material is in the form of a plurality of layers.

12. The polymeric material according to claim 1, wherein the polymeric material is encapsulated by a layer of liquid silicone.

13. The polymeric material according to claim 12, wherein the polymeric material is further coated with a layer of 3D fabric.

14. A formulation comprising the polymeric material according to claim 1, wherein the polymeric material is mixed with thermoplastics, or thermoplastic and/or thermosetting polyurethane systems.

15. The formulation according to claim 14, wherein the thermoplastics are selected from the group consisting of ethylvinylacetate, polypropylene, polyethylene, polyvinyl chloride, polyurea, and, TPU, and mixtures thereof.

16. An article comprising the polymeric material of claim 1.

17. The article according to claim 16, wherein the article is a motorcycling or sports helmet, a ballistic vest, a kneepad, an elbow pad, a back protector, gloves, footwear protectors, or protective equipments.

* * * * *